UNITED STATES PATENT OFFICE.

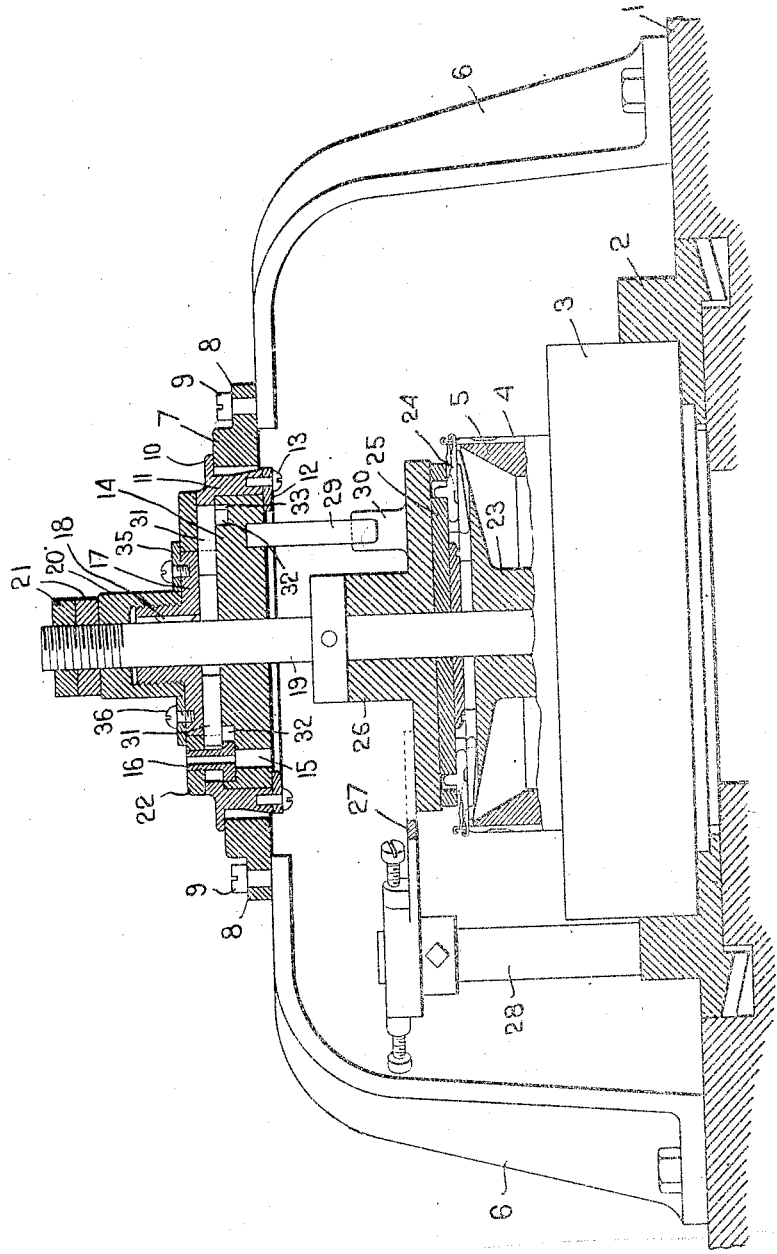

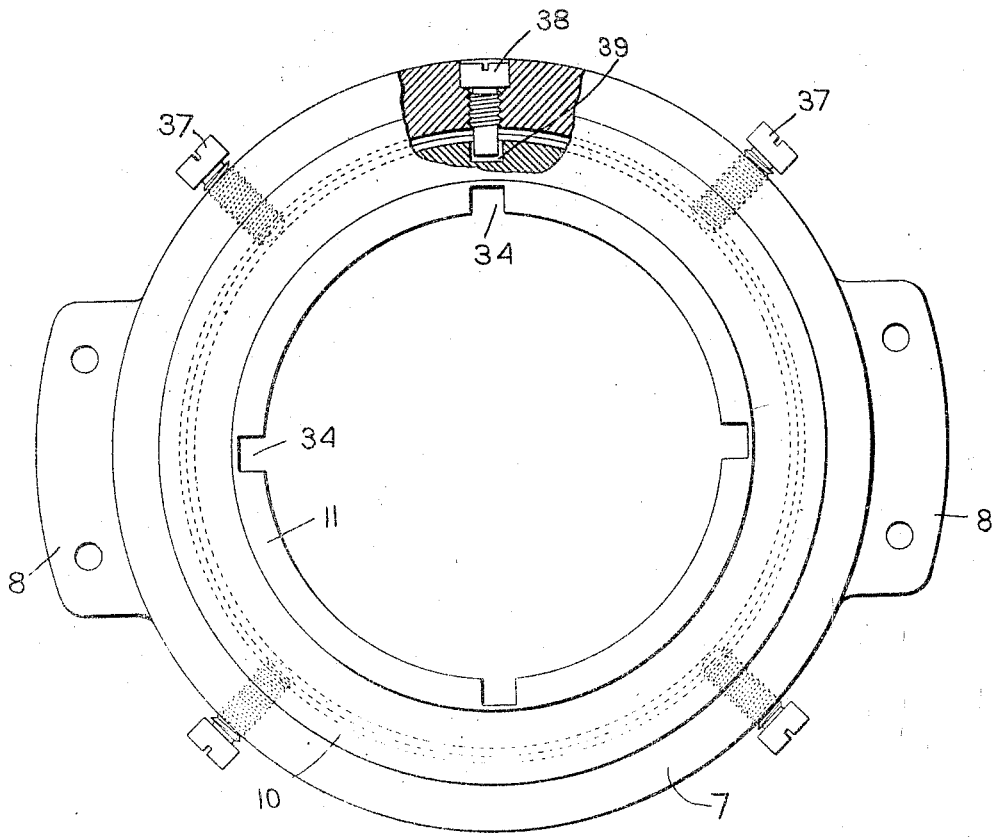
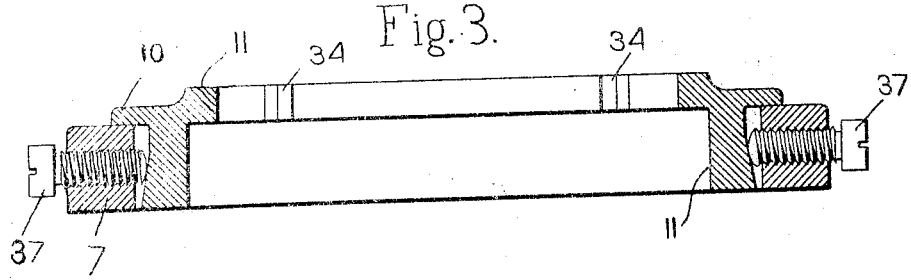

PATRICK P. LA MONTAGNE, OF BOURBONNAIS, ILLINOIS, ASSIGNOR TO PARAMOUNT KNITTING COMPANY, OF CHICAGO, ILLINOIS, A CORPORATION OF ILLINOIS.

KNITTING-MACHINE.

1,321,647.  Specification of Letters Patent.  Patented Nov. 11, 1919.

Application filed March 13, 1918. Serial No. 222,058.

*To all whom it may concern:*

Be it known that I, PATRICK P. LA MONTAGNE, a citizen of the United States, residing at Bourbonnais, county of Kankakee, State of Illinois, have invented an Improvement in Knitting-Machines, of which the following description, in connection with the accompanying drawing, is a specification, like characters on the drawing representing like parts.

This invention relates to a knitting machine of the circular type comprising a cylinder having a set of cylinder needles and a concentric dial provided with a set of dial instrumentalities such, for example, as dial needles coöperating in their action with the cylinder needles in the performance of the knitting operation.

The object of the invention is to provide means for accurately centering the dial with respect to the cylinder so as to provide for the proper and effective coöperation of the cylinder needles and dial instrumentalities.

The range of movement of the dial instrumentalities whatever their form may be, and which for the purpose of disclosing one form of the invention are herein illustrated as a set of dial needles, is quite limited and it is of the utmost importance that these instrumentalities shall be accurately positioned with respect to the cylinder needles in order that the proper looping functions may be accurately and uniformly effected. While it is possible by accurate construction to locate the axis of the dial parallel to the axis of the cylinder and to locate and adjust the dial in proper vertical relation with respect to the cylinder it is very difficult in practice to assemble and adjust the dial in accurate position transversely of the cylinder or in a direction normal to the axis of the cylinder without disturbing the other relative locations and adjustments.

The main purpose and object of this invention is therefore to provide means for bodily and relatively adjusting the dial and the cylinder in any direction normal to their axes without disturbing their axial parallelism and their relative position longitudinally or vertically.

The nature and objects of the invention will appear more fully from the accompanying description and drawings and will be particularly pointed out in the claim.

The drawings show so much of one well known type of circular knitting machine as is necessary to a disclosure of one form of the invention together with a preferred form of the invention embodied therein.

In the drawings,

Figure 1 is a side elevation partially in vertical cross section of the upper portion of the knitting machine;

Fig. 2 is a plan view partially broken away showing the ring support and that portion of the dial head adjacent thereto with a preferred form of adjustment means;

Fig. 3 is a view of the construction shown in Fig. 2 taken in vertical cross section.

This invention is adapted for use in various types of knitting machines but for convenience of disclosure and illustration is herein shown as embodied in a circular knitting machine provided with a set of cylinder needles and a set of dial needles and adapted for the performance of ribbed work and in which the machine is provided with a well known type of dogless head. As the invention is not concerned with the construction of the general features of the machine including the dial and dial supporting structure it will be understood that these parts are shown only for the purpose of disclosing the invention and are described only in a general way.

So also while the dial instrumentalities are herein shown as a set of separate latch dial needles it is to be understood that other forms of dial instrumentalities suitable for coöperation with the cylinder needles may be employed. The separate latch dial needle is illustrated because the throw or movement of this needle in effecting its coöperative action with the cylinder needles is necessarily small in extent and it is therefore peculiarly necessary that these needles shall be located with great accuracy in relation to the cylinder needles.

In the construction illustrated the bed plate of the knitting machine 1 supports a revoluble gear ring 2 carrying on its lower face gear teeth by which it is rotated in the usual manner. This gear ring 2 in turn supports a cam carrier 3 containing the cams for effecting the proper reciprocation of the cylinder needles 4. The needle cylinder 5 is supported by the bed plate centrally of the machine and is vertically grooved to receive the needles 4.

The dial supporting structure in the form illustrated is carried by a plurality of arms 6 extending upwardly and inwardly from the base plate 1.

This dial supporting structure which is herein shown as of the dogless head type includes a ring support 7 provided with radially projecting lugs or flanges 8 rigidly secured by set screws 9 to the arms 6. The upper surface of this ring support is accurately formed to present a plane surface normal to the axis of the cylinder 5. Upon this plane surface is seated the projecting flange 10 of a ring member 11 of the head and the lower surface of this flange is also accurately formed to present a plane surface.

An annular base 12 is secured by set screws 13 to the bottom of the ring member 11 and projects inwardly therefrom. Upon this annular base is rotarily mounted a yarn guide carrier 14 apertured at 15 and provided with the yarn guide 16 for the passage of the yarn. A hub 17 rests upon the yarn guide carrier 14 and is keyed at 18 to the dial supporting shaft 19 which passes centrally up through the yarn guide carrier and hub. A sleeve 20 fits over the upper end of the dial supporting shaft 19 and is screw threaded to the exterior to the hub 17. A pair of nuts 21 are threaded upon the upper end of the shaft 19 and abut against the sleeve 20. An annular cover 22 rests over the top of the ring member 11 and fills up the space between the said member and the periphery of the hub 17 and rotates with the thread guide 16.

The dial supporting shaft 19 extends downwardly and has secured thereto the usual dial bed 23. In this dial bed is mounted a set of dial instrumentalities herein shown as separate latch needles 24 of the general type shown in the patent to Pope & Randall No. 1,241,882, granted October 2, 1917. These needles are operated by a dial cam 25 connected to a dial cam carrier 26 rotarily mounted on the shaft 19.

The rotation of the dial cam carrier 26 is effected by a connection 27 extending therefrom to a post 28 rising from the gear ring 2. The rotary movement of the yarn guide carrier 14, yarn guide 16, and cover 22 is effected by a suitable connection between the yarn guide carrier 14 and the dial cam carrier 26 herein shown as a pin 29 extending down from the former into engagement with a projection 30 extending upwardly from the latter.

The dial supporting shaft 19 with the dial bed is held against rotation in a manner familiar in this type of mechanism. The hub 17 is radially slotted at the bottom and in these slots slide bolts 31, the sliding movement of the bolts being controlled by lugs 32 projecting downwardly therefrom into a cam groove 33 formed in the upper face of the yarn guide carrier 14. These bolts when projected outwardly by the cam groove enter notches or recesses 34 in the inner periphery of the ring member 11. The cam groove is so shaped that the bolts are in engagement with the recesses or notches 34 except as the yarn guide 16 passes when they are successively withdrawn inwardly. Thus the hub 17 and with it the dial supporting shaft 19 is prevented from rotation with respect to the ring member 11 and consequently with respect to the frame of the machine.

Any desirable vertical adjustment of the dial structure is effected through the nuts 21 and the sleeve 20. An annular plate 35 is shown connected by set screws 36 to the periphery of the hub 17 and overlapping the cover 22 to hold the latter in place.

The general construction of the machine will be clear from the foregoing description and it will be seen therefrom that the dial structure may be adjusted vertically with any degree of accuracy to bring the dial instrumentalities into the desired vertical position and that by properly manufacturing the parts the parallelism of the axes of the dial and of the cylinder may readily be secured.

The present invention is concerned with the adjustment of the dial structure so as accurately to center the dial with respect to the cylinder or in other words to adjust the dial in accurate position transversely of the cylinder or in a direction normal to the axis of the cylinder without disturbing the other relative locations and adjustments.

For this purpose the ring member 11 is adjustable on the ring support 7 the contacting plane abutting surfaces of these two members restraining the adjusting movement so that the only adjustment takes place in the direction normal to the axis of the cylinder. This adjustment is preferably secured by a plurality here shown as four set screws 37 projecting radially through the vertical portion of the ring support 7 with their ends abutting against the exterior periphery of the ring member 11. Hence, it will be seen that by adjusting these set screws 37 the ring member 11 with the entire dial structure may be shifted as required and in any direction normal to the axis of the cylinder without disturbing the other relative locations and adjustments. The inner ends of the set screws 37 are rounded and the outer periphery of the ring member is beveled slightly outwardly so that as the set screws 37 are locked up the tendency is to hold the peripheral flange 12 of the ring member 11 snugly down on the upper surface of the ring support 7. In order to prevent any possibility of relative rotary movement of the ring member 11 and ring support 7 while the adjustment is being made a set screw 38 is provided threaded into the ring support 7 and projecting into a recess 39 in the ring member 11.

Having fully described my invention, what I claim as new and desire to secure by Letters Patent is:

A dial adjusting mechanism for knitting machines comprising a ring support presenting a plane guiding surface, a ring member provided with a radial projection presenting a plane guiding surface seated on the guiding surface of the ring support and provided with a portion having an outwardly and downwardly inclined outer surface depending in said ring support, and adjusting screws extending radially through said ring support and abutting said inclined outer surface of the ring member whereby the plane guiding surfaces of the ring member and ring support are drawn together.

In testimony whereof, I have signed my name to this specification.

PATRICK P. LA MONTAGNE.